United States Patent
Furukawa

(10) Patent No.: US 11,336,439 B2
(45) Date of Patent: *May 17, 2022

(54) INFORMATION PROCESSING DEVICE, INFORMATION PROCESSING METHOD, AND RECORDING MEDIUM

(71) Applicant: NEC Corporation, Tokyo (JP)

(72) Inventor: Ryo Furukawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 239 days.

This patent is subject to a terminal disclaimer.

(21) Appl. No.: 16/533,967

(22) Filed: Aug. 7, 2019

(65) Prior Publication Data

US 2020/0076587 A1   Mar. 5, 2020

(30) Foreign Application Priority Data

Aug. 29, 2018  (JP) .............................. JP2018-160677

(51) Int. Cl.
| | |
|---|---|
| *H04L 9/08* | (2006.01) |
| *G06F 21/62* | (2013.01) |
| *H04L 9/14* | (2006.01) |
| *H04L 9/32* | (2006.01) |
| *G06F 21/60* | (2013.01) |

(52) U.S. Cl.
CPC .......... *H04L 9/0861* (2013.01); *G06F 21/602* (2013.01); *G06F 21/6218* (2013.01); *H04L 9/0894* (2013.01); *H04L 9/14* (2013.01); *H04L 9/3247* (2013.01)

(58) Field of Classification Search
None
See application file for complete search history.

(56) References Cited

U.S. PATENT DOCUMENTS

| | | | | |
|---|---|---|---|---|
| 2010/0281265 | A1* | 11/2010 | Ogawa .................. | H04L 9/0861 713/176 |
| 2012/0185683 | A1 | 7/2012 | Krstic et al. | |
| 2019/0377886 | A1* | 12/2019 | Roy .................... | G06F 21/6209 |

FOREIGN PATENT DOCUMENTS

| | | |
|---|---|---|
| JP | 2008-259042 A | 10/2008 |
| JP | 2009-200990 A | 9/2009 |
| JP | 5703391 B2 | 4/2015 |

* cited by examiner

*Primary Examiner* — Brandon Hoffman
(74) *Attorney, Agent, or Firm* — Sughrue Mion, PLLC

(57) ABSTRACT

An information processing device which includes: a secure storage accessible by only trusted software, in which a first encryption key keeping unit keeping a first encryption key is configured inside a access limit area; a second encryption key keeping unit keeping as a second encryption key; a setup processing activation unit acquiring the second encryption key from the second encryption key keeping unit in response to activation of a local device, and outputting the acquired second encryption key; and a software execution unit being executed as the trusted software, acquiring the second encryption key from the setup processing activation unit, acquiring the first encryption key from the first encryption key keeping unit together with acquisition of the second encryption key, constructing a common encryption key by using the first encryption key and second encryption key, and setting up an encrypted file system by using the constructed common encryption key.

10 Claims, 14 Drawing Sheets

Fig.2
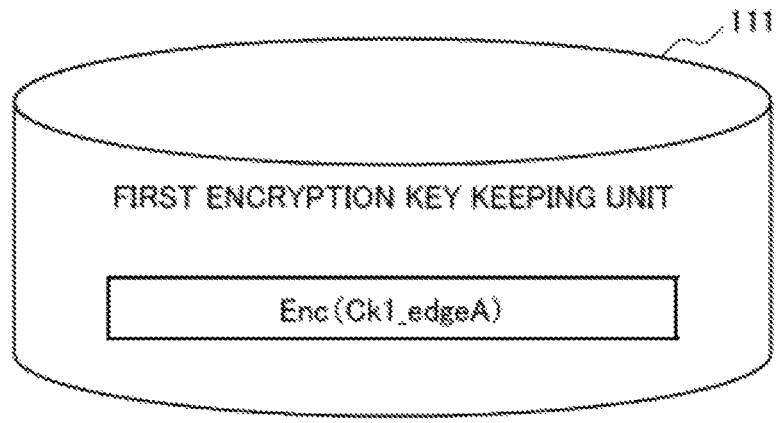
Fig.3
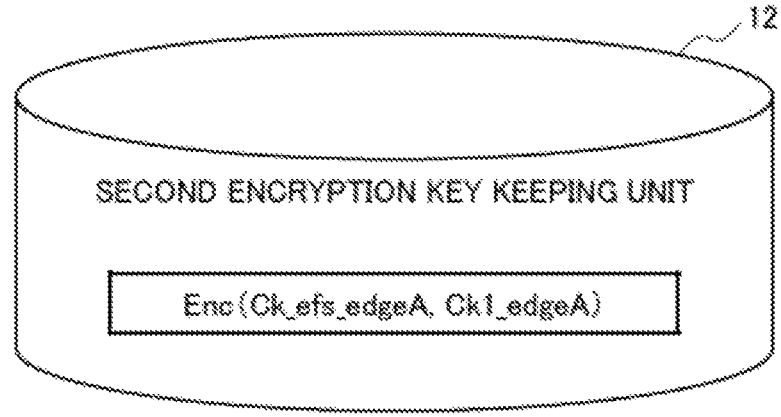
Fig.4
| FILE | ENCRYPTED INFORMATION |
|---|---|
| FILE 1 | Enc(FILE 1,Ck_efs_edgeA) |
| FILE 2 | Enc(FILE 2,Ck_efs_edgeA) |
| FILE 3 | Enc(FILE 3,Ck_efs_edgeA) |
| FILE 4 | Enc(FILE 4,Ck_efs_edgeA) |
| FILE 5 | Enc(FILE 5,Ck_efs_edgeA) |
| FILE 6 | Enc(FILE 6,Ck_efs_edgeA) |
| FILE 7 | Enc(FILE 7,Ck_efs_edgeA) |
| ... | ... |

Fig.8

| FILE | SIGNATURE INFORMATION |
|---|---|
| EFS ENCRYPTION KEY CONSTRUCTION UNIT | Sig (Hash (EFS ENCRYPTION KEY CONSTRUCTION UNIT), Pk_sig_edgeA) |
| ENCRYPTED FILE SYSTEM SETUP UNIT | Sig (Hash (ENCRYPTED FILE SYSTEM SETUP UNIT), Pk_sig_edgeA) |
| TRUSTED SOFTWARE 1 | Sig (Hash (TRUSTED SOFTWARE 1), Pk_sig_edgeA) |

Fig.11

| VERIFICATION TARGET | FILE SYSTEM VERIFICATION INFORMATION |
|---|---|
| ENCRYPTED FILE SYSTEM | Sig (Hash (ENCRYPTED FILE SYSTEM), Pk_sig_edgeA) |

Fig.14

| FILE | STORAGE INFORMATION |
|---|---|
| FILE 11 | Enc(FILE 11,Ck_efs_edgeA_2) |
| FILE 12 | Enc(FILE 12,Ck_efs_edgeA_2) |
| FILE 13 | Enc(FILE 13,Ck_efs_edgeA_2) |
| FILE 14 | Enc(FILE 14,Ck_efs_edgeA_2) |
| FILE 15 | Enc(FILE 15,Ck_efs_edgeA_2) |
| FILE 16 | Enc(FILE 16,Ck_efs_edgeA_2) |
| FILE 17 | Enc(FILE 17,Ck_efs_edgeA_2) |
| ... | ... |

Fig.15

| ENCRYPTED AREA IDENTIFIER | SECOND ENCRYPTION KEY |
|---|---|
| ENCRYPTED AREA 410-1 | Enc(Ck_efs_edgeA_1, Ck1_edgeA) |
| ENCRYPTED AREA 410-2 | Enc(Ck_efs_edgeA_2, Ck1_edgeA) |
| ... | ... |
| ENCRYPTED AREA 410-N | Enc(Ck_efs_edgeA_N, Ck1_edgeA) |

INFORMATION PROCESSING DEVICE, INFORMATION PROCESSING METHOD, AND RECORDING MEDIUM

This application is based upon and claims the benefit of priority from Japanese Patent Application No. 2018-160677, filed on Aug. 29, 2018, the disclosure of which is incorporated herein in its entirety by reference.

TECHNICAL FIELD

The present invention relates to an information processing device, an information processing method, and a program. In particular, the present invention relates to an information processing device, an information processing method, and a program which protect information by utilizing a file system including an encrypted area.

BACKGROUND ART

Internet of things (IoT) enables to connect various things to the Internet, and enables collection of data by a thing, and actuation to a thing. In an IoT system, a computer called an edge which performs simple data processing is disposed between an IoT device associated with a thing, and a cloud.

Along with improvement in performance of a computer, even an edge are able to execute high-load data processing typified by artificial intelligence (AI). As a result, instantaneous data processing in an edge and instantaneous reflection to an IoT device are achieved. When an edge comes to execute various kinds of processing, data used in the processing, processed data, and a processing program itself become valuable information. Thus, high-level security is required for an edge as well. In particular, since a model of AI is learned with a great cost, outflow of the information may be a risk for a user of an IoT system. Since edges are distributedly arranged in a factory or a city, it is difficult to spend physical antitheft cost on all edges. Thus, when an edge is stolen, protection of information in the edge is required.

A terminal device such as a personal computer is protected by a technique such as hard disc encryption or an encrypted file system in such a way that information saved inside is not stolen. According to these techniques, by abstracting a method of accessing information encrypted in a layer of an operating system (OS), information can be accessed even when an application individually does not decrypt the information. Thus, both convenience and security are accomplished by using these techniques. However, in order to acquire a decryption key for decrypting encrypted information, these techniques need input of a key and a password by a manager, and distribution of a key by a management server.

PTL 1 (Japanese Patent No. 5703391) discloses a method of performing boot processing for a computer device having a storage medium which is encrypted by utilizing full disc encryption, and which stores an OS.

PTL 2 (Japanese Unexamined Patent Application Publication No. 2009-200990) discloses a secret information management system that does not previously let a manager (a third-party organization) know an encryption key, and can restrict an encryption key for recovering when a storage medium having a calculation function is lost.

PTL 3 (Japanese Unexamined Patent Application Publication No. 2008-259042) discloses an information protection system which protects contents by using an encryption key and a decryption key in a system including a storage device and a terminal device having a content protection function. The system of PTL 3 includes a terminal device having a function of performing an encryption session on the basis of mutual equipment authentication based on an electronic certificate, and a storage device which stores information.

When a system stops due to some factor, an edge constituting an IoT system is requested to recover by performing autonomous reactivation without requiring intervention by a manager. Thus, it is difficult to apply an existing technique that requires input by a manager, to an edge constituting an IoT system. Moreover, an IoT system is not necessarily utilized in only an environment in which a network from an edge to a management server operating on a cloud or the like is stably connectable. Thus, when connection to a management server is needed in order to recover a system, there is a problem that it becomes difficult to recover the system without being able to connect to a network.

The method of PTL 1 needs to receive a qualification certificate from a user at boot processing of a computer device having a storage medium encrypted by using disc encryption. Thus, a scheme of PTL 1 has a problem that input from a user is needed at boot processing of a computer device. Moreover, the method of PTL 1 has a problem that it is possible to activate an OS included in an encrypted storage medium, but it is not possible to set up in such a way that one area in an encrypted storage medium is accessible from a normal OS.

The system of PTL 2 needs a user calculator utilized by a user, in addition to an encrypted and secure storage medium, in order to generate a key for decrypting an encrypted storage medium. Thus, a scheme of PTL 2 has a problem that input of information via a user calculator which is not necessarily secure is needed in order to generate a key for decrypting an encrypted storage medium.

The system of PTL 3 is intended for license management of digital contents, does not need to process a large amount of contents at a time, and therefore, can ensure time for executing relatively complicated processing. However, since an edge of an actual IoT system needs to rapidly process a large amount of data transmitted from a sensor, simplification of processing is requested. Thus, when a scheme of PTL 3 is applied to an edge of an IoT system, delay of processing occurs as complicated processing is frequently performed, and there is a possibility that it becomes difficult to continuously run an IoT system.

SUMMARY

An example object of the present invention is to provide an information processing device which accomplishes both autonomous reactivation of an edge and encryption of information and enables secure and continuous running of an IoT system, without being stably connected to a network.

An information processing device according to an example aspect of the present invention includes: a secure storage which includes an access limit area accessible by only trusted software, and in which a first encryption key keeping unit keeping a first encryption key is configured inside the access limit area; a second encryption key keeping unit which keeps, as a second encryption key, a common encryption key encrypted by the first encryption key; an encrypted file system including an encrypted area recording processing target data encrypted by the common encryption key; a setup processing activation unit which acquires the second encryption key from the second encryption key keeping unit in response to activation of a local device, and outputs the acquired second encryption key; and a software execution unit which is executed as the trusted software, acquires the second encryption key from the setup processing activation unit, acquires the first encryption key from the first encryption key keeping unit in line with acquisition of the second encryption key, constructs the common encryption key by using the first encryption key and the second encryption key, and sets up the encrypted file system in such a way as to be accessible from any software by using the constructed common encryption key.

An information processing method according to an example aspect of the present invention includes: by an information processing device, keeping a first encryption key in a first encryption key keeping unit inside an access limit area accessible by only trusted software executed by a local device; keeping a common encryption key encrypted by using the first encryption key in a second encryption key keeping unit as a second encryption key; acquiring the second encryption key from the second encryption key keeping unit in response to activation of a local device; outputting the acquired second encryption key to the trusted software; causing the trusted software to acquire the first encryption key from the first encryption key keeping unit in line with acquisition of the second encryption key; causing the trusted software to construct the common encryption key by using the acquired first encryption key and second encryption key; and causing the trusted software to set up, by using the common encryption key, an encrypted file system including an encrypted area recording processing target data encrypted by the common encryption key, in such a way as to be accessible from any software.

A program according to an example aspect of the present invention causes a computer to execute: processing of keeping a first encryption key in a first encryption key keeping unit inside an access limit area accessible by only trusted software; processing of keeping a common encryption key encrypted by using the first encryption key in a second encryption key keeping unit as a second encryption key; processing of acquiring the second encryption key from the second encryption key keeping unit in response to activation of a local device; processing of outputting the acquired second encryption key to the trusted software; processing of causing the trusted software to acquire the first encryption key from the first encryption key keeping unit in line with acquisition of the second encryption key; processing of causing the trusted software to construct the common encryption key by using the acquired first encryption key and second encryption key; and processing of causing the trusted software to set up, by using the common encryption key, an encrypted file system including an encrypted area recording processing target data encrypted by the common encryption key, in such a way as to be accessible from any software.

BRIEF DESCRIPTION OF THE DRAWINGS

Exemplary features and advantages of the present invention will become apparent from the following detailed description when taken with the accompanying drawings in which:

FIG. 2 is a conceptual diagram illustrating one example of a first encryption key stored in a first encryption key keeping unit of the information processing device according to the first example embodiment of the present invention;

FIG. 3 is a conceptual diagram illustrating one example of a second encryption key stored in a second encryption key keeping unit of the information processing device according to the first example embodiment of the present invention;

FIG. 4 is a conceptual diagram illustrating one example of encrypted information stored in an encrypted file system of the information processing device according to the first example embodiment of the present invention;

FIG. 8 is a conceptual diagram illustrating one example of signature information stored in a trusted software signature storage unit of the information processing device according to the second example embodiment of the present invention;

FIG. 11 is a diagram illustrating one example of file system verification information stored in a file system verification information storage unit of the information processing device according to the third example embodiment of the present invention;

FIG. 14 is a conceptual diagram illustrating one example of storage information stored in an encrypted area included in an encrypted file system of the information processing device according to the fourth example embodiment of the present invention;

FIG. 15 is a conceptual diagram illustrating one example of a second encryption key stored in a second encryption key keeping unit of the information processing device according to the fourth example embodiment of the present invention;

EXAMPLE EMBODIMENT

Figure 1:
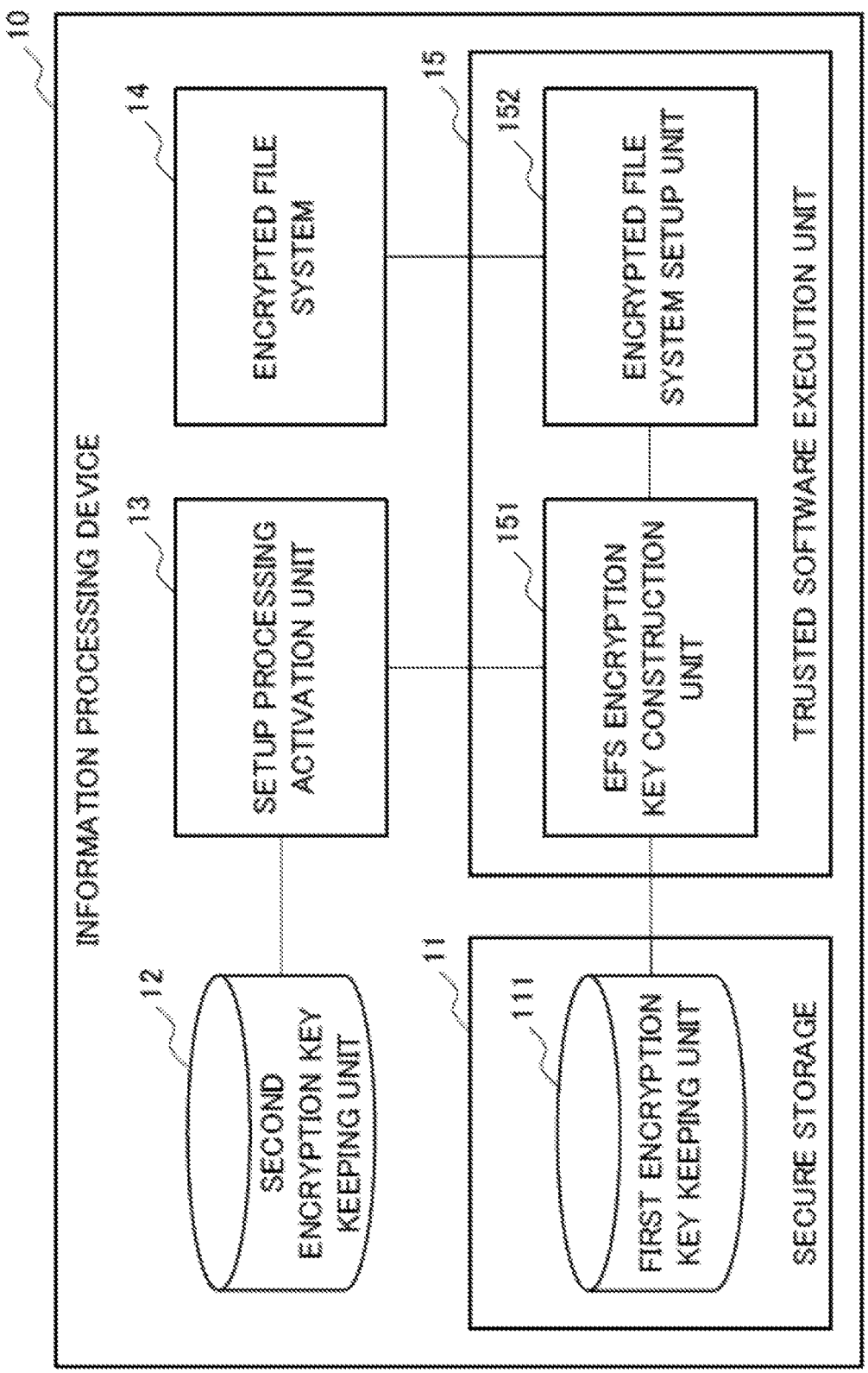
FIG. 1 is a block diagram illustrating one example of a configuration of an information processing device according to a first example embodiment of the present invention.

Example embodiments of the present invention will be described below with reference to the drawings. In the following example embodiments, technically preferable limitations are imposed to carry out the present invention, but the scope of this invention is not limited to the following description. In all drawings used to describe the following example embodiments, the same reference numerals denote similar parts unless otherwise specified. In addition, in the following example embodiments, a repetitive description of similar configurations or arrangements and operations may be omitted.

First Example Embodiment

First, an information processing device according to a first example embodiment of the present invention is described with reference to the drawings. The information processing device according to the present example embodiment has a protection function of a storage area, and protects information stored in the storage area by utilizing an encrypted file system. For example, the information processing device according to the present example embodiment is disposed near a data acquisition device of a sensor, a measuring instrument, or the like, and analyzes data acquired by the data acquisition device. The information processing device according to the present example embodiment transmits necessary data among data acquired by the data acquisition device to a data processing device configured in a server or the like disposed at a remote place.

(Configuration)

FIG. 1 is a block diagram illustrating one example of a configuration of an information processing device 10 according to the present example embodiment. As in FIG. 1, the information processing device 10 includes a secure storage 11, a second encryption key keeping unit 12, a setup processing activation unit 13, an encrypted file system 14, and a trusted software execution unit 15. Secure isolated areas (also referred to as access limit areas) are configured inside the secure storage 11 and the trusted software execution unit 15.

The secure storage 11 is connected to the trusted software execution unit 15. A secure isolated area is configured inside the secure storage 11. The secure storage 11 is a storage accessed from the trusted software execution unit 15. In the present example embodiment, the secure storage 11 is accessible from only the trusted software execution unit 15. The secure storage 11 includes a first encryption key keeping unit 111.

The first encryption key keeping unit 111 (also referred to as a first encryption key keeping area) stores and keeps a first encryption key. FIG. 2 is one example (Ck1_edgeA) of the first encryption key kept by the first encryption key keeping unit 111. Note that the first encryption key in FIG. 2 is one example, and does not limit the first encryption key kept by the first encryption key keeping unit 111.

The second encryption key keeping unit 12 (also referred to as a second encryption key keeping area) stores and keeps a second encryption key. The second encryption key is produced by encrypting, by using the first encryption key, an EFS encryption key (also referred to as a common encryption key) being a key for temporarily encrypting and decrypting information (EFS: encrypted file system). In other words, the second encryption key is an encryption key in which the EFS encryption key is formed to be unrestorable without the first encryption key. FIG. 3 is one example (Enc (Ck_efs_edgeA, Ck1_edgeA)) of the second encryption key kept by the second encryption key keeping unit 12. The second encryption key Enc (Ck_efs_edgeA, Ck1_edgeA) in FIG. 3 is encrypted information relating to an EFS encryption key Ck_efs_edgeA encrypted by using a first encryption key Ck1_edgeA. Note that the second encryption key in FIG. 3 is one example, and does not limit the second encryption key kept by the second encryption key keeping unit 12.

The setup processing activation unit 13 is inserted in an activation sequence of a device. The setup processing activation unit 13 is invoked when the device is activated. When a device is activated, the setup processing activation unit 13 outputs the second encryption key kept by the second encryption key keeping unit 12 to the trusted software execution unit 15, and causes the trusted software execution unit 15 to start setup processing of the encrypted file system 14. For example, the setup processing activation unit 13 is registered in a boot sequence in Linux (registered trademark).

The encrypted file system 14 encrypts and then stores information (data) in a predetermined unit. For example, the encrypted file system 14 encrypts and then stores information in a file unit, a segment unit, a unit combining a plurality of files, or the like. The encrypted file system 14 holds the EFS encryption key Ck_efs_edgeA in a computer memory connected to a device. When access processing including reading and writing of information from any software is performed, the encrypted file system 14 encrypts and decrypts information by using the EFS encryption key Ck_efs_edgeA.

FIG. 4 is one example of encrypted information stored in the encrypted file system 14. In the example of FIG. 4, the encrypted file system 14 stores encrypted information in a file unit by using the EFS encryption key Ck_efs_edgeA. In FIG. 4, Enc (A, B) represents encrypted information of information A encrypted by using a common encryption key B (EFS encryption key).

The trusted software execution unit 15 (also referred to as a software execution unit) constructs an EFS encryption key Ck_efs_edgeA by using the first encryption key Ck1_edgeA and the second encryption key Enc (Ck_efs_edgeA, Ck1_edgeA). The trusted software execution unit 15 outputs the constructed EFS encryption key Ck_efs_edgeA to the encrypted file system 14. The trusted software execution unit 15 sets up the encrypted file system 14 in such a way as to be accessible from any software. The trusted software execution unit 15 assures that software operating inside is not tampered with and trusted software.

The trusted software execution unit 15 includes an EFS encryption key construction unit 151 and an encrypted file system setup unit 152. For example, the EFS encryption key construction unit 151 and the encrypted file system setup unit 152 are configured as software operating in the trusted software execution unit 15. In this case, the trusted software execution unit 15 assures that software (the EFS encryption key construction unit 151 and the encrypted file system setup unit 152) operating inside is not tampered with and trusted software.

The EFS encryption key construction unit 151 (also referred to as a common encryption key construction unit) verifies whether the read setup processing activation unit 13 is a valid process. When determining that the setup processing activation unit 13 is a valid process, the EFS encryption key construction unit 151 reads the first encryption key Ck1_edgeA from the first encryption key keeping unit 111 in the secure storage 11. The EFS encryption key construction unit 151 constructs an EFS encryption key Ck_efs_edgeA by using the first encryption key Ck1_edgeA and the second encryption key Enc (Ck_efs_edgeA, Ck1_edgeA). The EFS encryption key construction unit 151 outputs the constructed EFS encryption key Ck_efs_edgeA to the encrypted file system setup unit 152.

The encrypted file system setup unit 152 (also referred to as a setup unit) acquires the EFS encryption key Ck_efs_edgeA from the EFS encryption key construction unit 151. The encrypted file system setup unit 152 outputs the EFS encryption key Ck_efs_edgeA to the encrypted file system 14. The encrypted file system setup unit 152 sets up the encrypted file system 14 in such a way that information can be read and written from any software.

The above is a description regarding the configuration of the information processing device 10 according to the present example embodiment. Note that the configuration illustrated in each of FIGS. 1 to 4 is one example, and does not limit the configuration of the information processing device 10 to an unchanged form.

(Operation)

Figure 5:
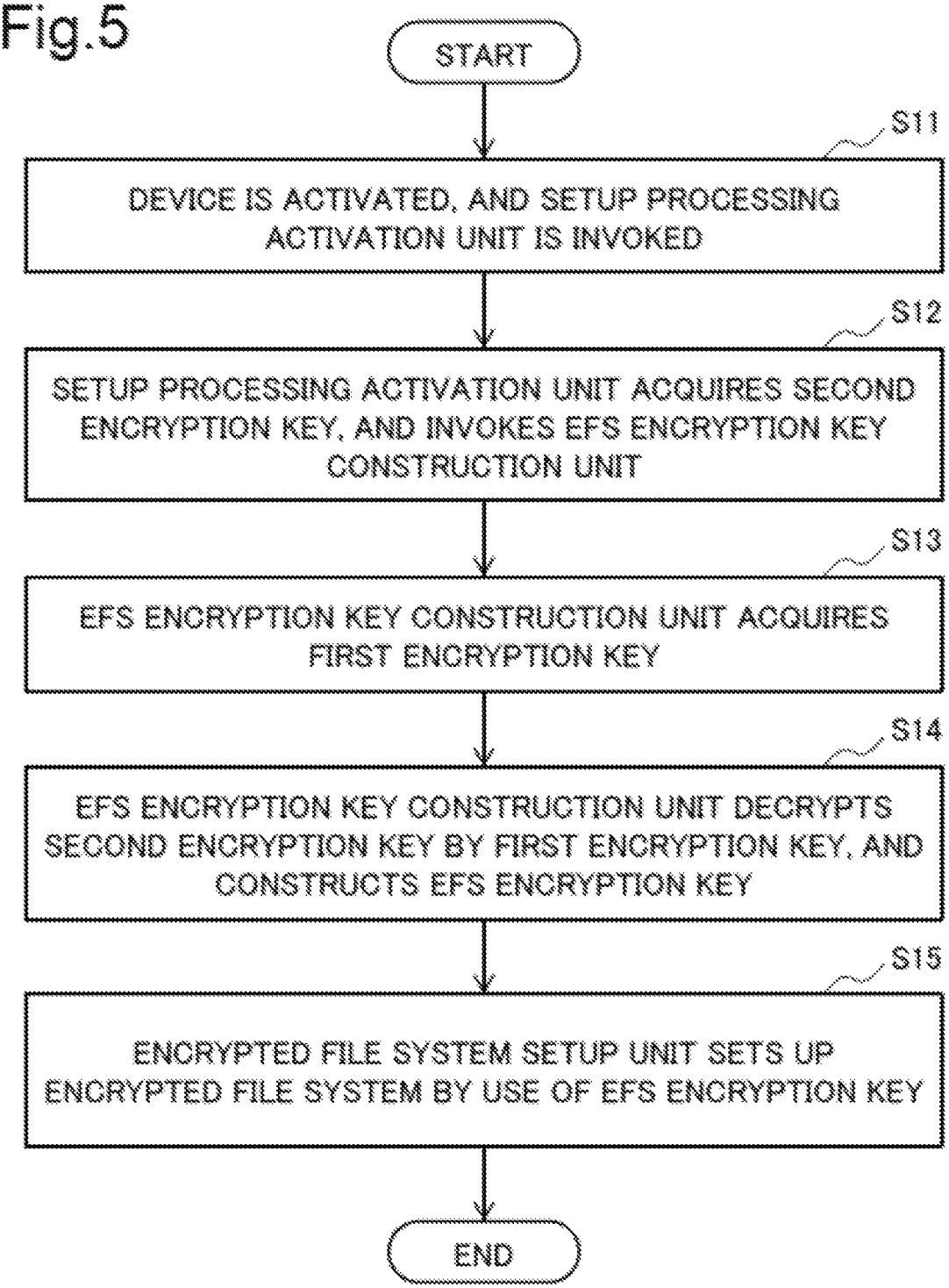
FIG. 5 is a flowchart for describing an overview of an operation of the information processing device according to the first example embodiment of the present invention.

Next, an overview of an operation of the information processing device 10 according to the present example embodiment is described with reference to the drawing. FIG. 5 is a flowchart for describing an overview of an operation of the information processing device 10. Note that a component (FIG. 1) of the information processing device 10 is described as a major part of an operation in the description along the flowchart in FIG. 5 below, but it is also possible to regard the information processing device 10 as a major part of an operation.

In FIG. 5, first, when the information processing device 10 is activated, the setup processing activation unit 13 is invoked (step S11).

Next, the setup processing activation unit 13 acquires a second encryption key from the second encryption key keeping unit 12. The setup processing activation unit 13 outputs the acquired second encryption key to the EFS encryption key construction unit 151, and invokes the EFS encryption key construction unit 151 (step S12).

Next, the EFS encryption key construction unit 151 of the trusted software execution unit 15 acquires a first encryption key from the first encryption key keeping unit 111 (step S13).

Next, the EFS encryption key construction unit 151 constructs an EFS encryption key by using the first encryption key and the input second encryption key (step S14). The EFS encryption key construction unit 151 outputs the constructed EFS encryption key to the encrypted file system setup unit 152.

Then, the encrypted file system setup unit 152 executes setup of the encrypted file system 14 by using the EFS encryption key (step S15).

An encrypted file system is mounted on a path called "/secure" by the procedure described above, and accordingly, encryption and decryption using an EFS encryption key are executed in a file unit when software accesses the "/secure". When information is held in the encrypted file system 14 as in FIG. 4, it becomes possible to correctly read a file by decrypting an encrypted file by using an EFS encryption key.

The above is a description regarding the overview of the operation of the information processing device 10 according to the present example embodiment. Note that the processing along the flowchart in FIG. 5 is one example, and does not limit the operation of the information processing device 10 to an unchanged form.

As described above, an information processing device according to the present example embodiment is provided with a secure storage including a first encryption key keeping unit, a second encryption key keeping unit, an encrypted file system, a setup processing activation unit, and a software execution unit. The secure storage includes an access limit area accessible by only trusted software executed by a local device, and the first encryption key keeping unit which keeps a first encryption key is configured inside the access limit area. The second encryption key keeping unit keeps, as a second encryption key, a common encryption key encrypted by the first encryption key. The encrypted file system includes an encrypted area recording processing target data encrypted by the common encryption key. For example, the encrypted file system records processing target data encrypted for each file by the common encryption key. The setup processing activation unit acquires the second encryption key from the second encryption key keeping unit in response to activation of the information processing device according to the present example embodiment, and outputs the acquired second encryption key. The software execution unit is executed as the trusted software, and when acquiring the second encryption key from the setup processing activation unit, the software execution unit acquires the first encryption key from the first encryption key keeping unit in line with acquisition of the second encryption key. The software execution unit constructs the common encryption key by using the first encryption key and the second encryption key, and sets up the encrypted file system in such a way as to be accessible from any software by using the constructed common encryption key.

The software execution unit includes a common encryption key construction unit and a setup unit. The common encryption key construction unit is connected to the setup processing activation unit and the first encryption key keeping unit. The common encryption key construction unit acquires a second encryption key from the setup processing activation unit, and verifies whether the setup processing activation unit being a transmission source of the second encryption key is a valid process. When the setup processing activation unit is a valid process, the software execution unit acquires a first encryption key from the first encryption key keeping unit, and constructs a common encryption key by using the acquired first encryption key and second encryption key. The setup unit is connected to the common encryption key construction unit and the encrypted file system. The setup unit acquires the common encryption key from the common encryption key construction unit, and sets up the encrypted file system in such a way as to be accessible from any software by using the acquired common encryption key.

An operation of the information processing device according to the present example embodiment can also be expressed as follows. When the information processing device according to the present example embodiment is activated, the setup processing activation unit reads a second encryption key from the setup processing activation unit, transfers the second encryption key to the common encryption key construction unit, and then invokes the common encryption key construction unit. The common encryption key construction unit verifies whether the read setup processing activation unit is a valid process. When determining that the setup processing activation unit is a valid process, the common encryption key construction unit reads a first encryption key from the first encryption key keeping unit in the secure storage, and constructs a common encryption key by using the first encryption key and the second encryption key. The common encryption key construction unit transfers the constructed common encryption key to an encrypted file system setup unit, and then invokes the encrypted file system setup unit. The encrypted file system setup unit transfers the common encryption key to the encrypted file system, and then sets up the encrypted file system in such a way as to be accessible from any software.

The information processing device according to the present example embodiment sets up the encrypted file system into an accessible state by using trusted software in an isolated area and an encryption key. Thus, an information processing device according to the present example embodiment can accomplish, by the information processing device alone, both protection of information and continuous running of an Internet of things (IoT) system.

The information processing device according to the present example embodiment is set up in such a way as to be able to autonomously access information stored in an encrypted file system from any software when the device is activated. Thus, the information processing device according to the present example embodiment enables any software to take advantage of information stored in an encrypted file system.

Furthermore, with the information processing device according to the present example embodiment, a second encryption key, encrypted information stored in the encrypted file system, and information protected by the secure storage can only be acquired even when the present device is stolen. Thus, a common encryption key for decrypting encrypted information is not constructed, and therefore, encrypted information stored in the encrypted file system is protected.

As above, the present example embodiment is able to reduce a leakage risk of information encrypted and then stored in an encrypted file system, even when the information processing device is stolen. Moreover, according to the present example embodiment, a system halt resulting from protection of information is able to be eliminated even when a network is interrupted, or when a manager is absent. In other words, the present example embodiment enables both information protection and continuous running in an IoT system.

Furthermore, according to the present example embodiment, it becomes possible to easily utilize a plurality of encrypted file systems without accessing a secure isolated area, by configuring in such a way that a second encryption key is disposed in a non-secure storage area that is other than the secure isolated area.

In other words, the present example embodiment is able to provide an information processing device which accomplishes both autonomous reactivation of an edge and encryption of information, and enables secure and continuous running of an IoT system, without being stably connected to a network.

Second Example Embodiment

Next, an information processing device according to a second example embodiment of the present invention is described with reference to the drawings. The information processing device according to the present example embodiment is different from the information processing device according to the first example embodiment in that a trusted operating system (OS) verifies a software signature.

(Configuration)

Figure 6:
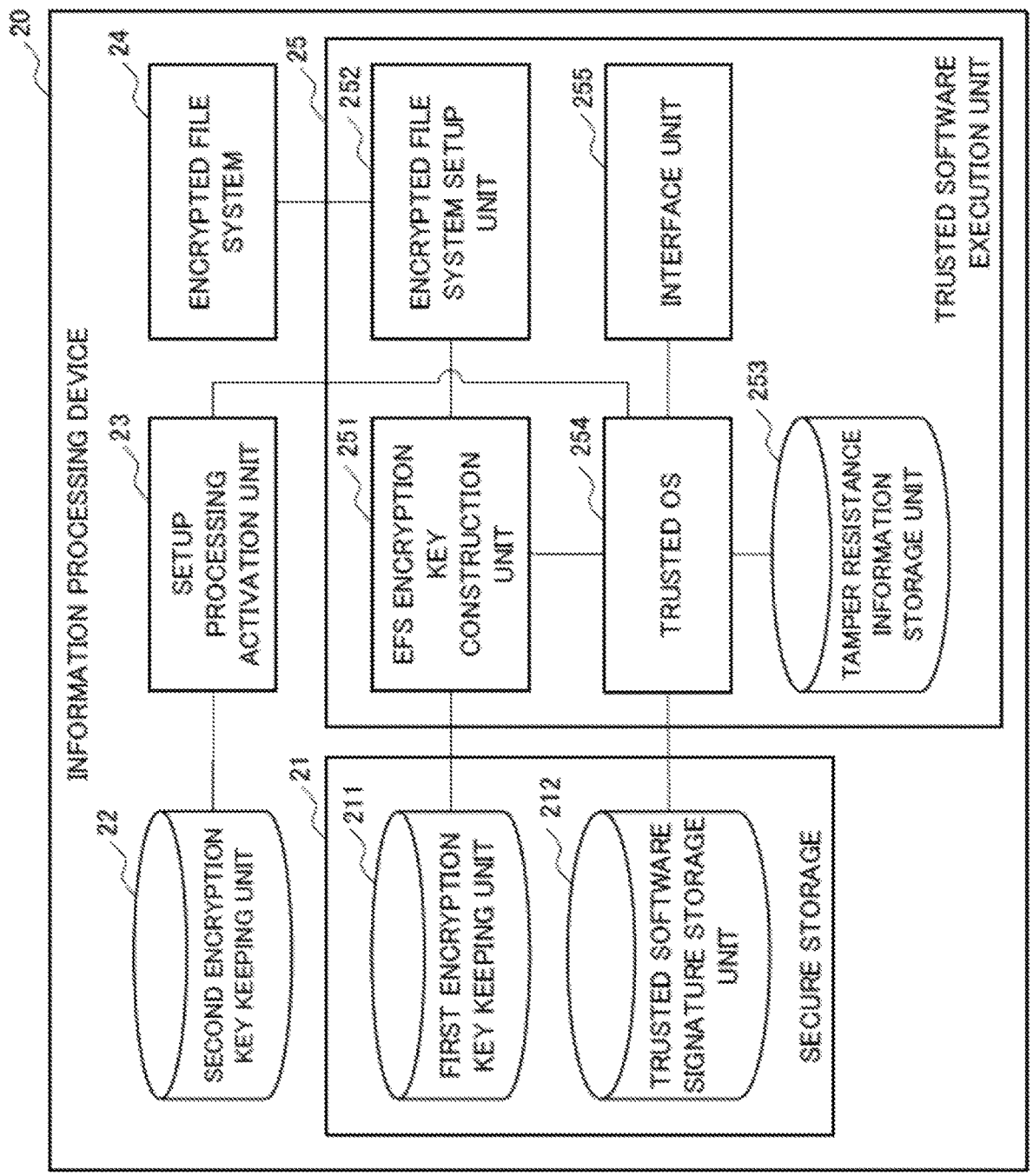
FIG. 6 is a block diagram illustrating one example of a configuration of an information processing device according to a second example embodiment of the present invention.

FIG. 6 is a block diagram illustrating one example of a configuration of an information processing device 20 according to the present example embodiment. As in FIG. 6, the information processing device 20 includes a secure storage 21, a second encryption key keeping unit 22, a setup processing activation unit 23, an encrypted file system 24, and a trusted software execution unit 25. Secure isolated areas are configured inside the secure storage 21 and the trusted software execution unit 25.

The information processing device 20 (FIG. 6) according to the present example embodiment is different from the information processing device 10 (FIG. 1) according to the first example embodiment in configurations of the secure storage 21 and the trusted software execution unit 25. Components other than the secure storage 21 and the trusted software execution unit 25 in the information processing device 20 (FIG. 6) are similar to those in the information processing device 10 (FIG. 1) except for some functions. Thus, a difference from the information processing device 10 (FIG. 1) is mainly described below.

As in FIG. 6, the secure storage 21 includes a trusted software signature storage unit 212 in addition to a first encryption key keeping unit 211. The secure storage 21 is encrypted with a fourth encryption key which is an encryption key being configured under a predetermined rule by a third encryption key described later, and serving to encrypt and decrypt data encrypted inside the secure storage. In other words, the first encryption key keeping unit 211 and the trusted software signature storage unit 212 are also encrypted by the fourth encryption key.

Figure 7:
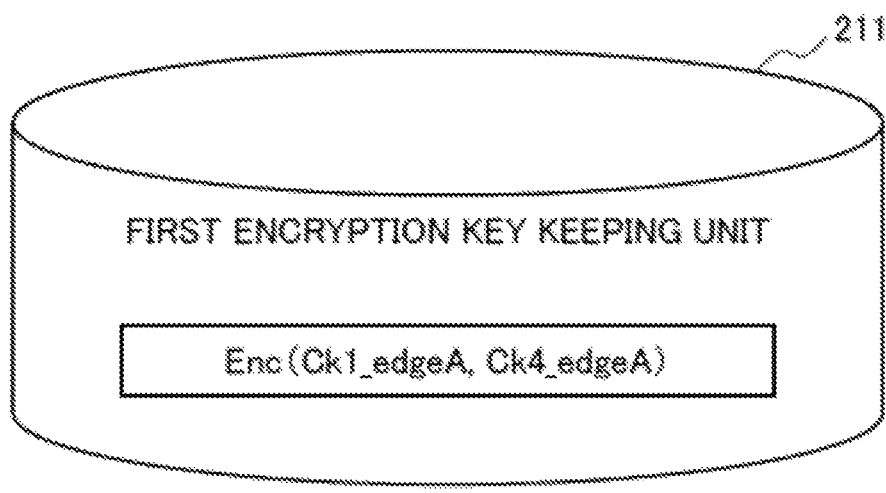
FIG. 7 is a conceptual diagram illustrating one example of encrypted information stored in a first encryption key keeping unit of the information processing device according to the second example embodiment of the present invention.

The first encryption key keeping unit 211 keeps encrypted information relating to a first encryption key encrypted by using the fourth encryption key. FIG. 7 is one example of encrypted information Enc(Ck1_edgeA, Ck4_edgeA) kept by the first encryption key keeping unit 211. The encrypted information Enc(Ck1_edgeA, Ck4_edgeA) is encrypted information relating to a first encryption key (Ck1_edgeA) encrypted by using a fourth encryption key (Ck4_edgeA). Note that encrypted information in FIG. 7 is one example, and does not limit encrypted information kept by the first encryption key keeping unit 211.

A trusted software signature (also referred to as signature information) being an electronic signature for trusted software is stored in the trusted software signature storage unit 212 (also referred to as a signature information storage area). The trusted software signature stored in the trusted software signature storage unit 212 is also encrypted by a fourth encryption key.

FIG. 8 is one example of signature information stored in the trusted software signature storage unit 212. In FIG. 8, Sig(A, B) represents a signature generated by using a signature key B for A. Signature information is stored in the trusted software signature storage unit 212 for each piece of trusted software. In the example of FIG. 8, signature information generated by using a signature key Pk_sig_edgeA for trusted software for which a hash value is taken is stored in the trusted software signature storage unit 212. The signature key Pk_sig_edgeA is a key for signature of a key pair (Pk_sig_edgeA, Pk_var_edgeA) of public key encryption generated with a third encryption key K3_edgeA as a seed.

Furthermore, as in FIG. 6, the trusted software execution unit 25 includes a tamper resistance information storage unit 253, a trusted OS 254, and an interface unit 255, in addition to an EFS encryption key construction unit 251, and an encrypted file system setup unit 252.

The tamper resistance information storage unit 253 (also referred to as a tamper resistance information storage area) stores a verification key of a trusted software signature, and a third encryption key serving as a generation source of an encryption key necessary for decryption of information stored in the secure storage 21. The tamper resistance information storage unit 253 has high tamper resistance, and assures that overwriting and reading are not enabled from outside of the trusted software execution unit 25.

The trusted OS 254 verifies trusted software by using the trusted software signature and the third encryption key. The trusted OS 254 operates only trusted software determined to be valid, and enables reading and writing of the trusted software and the secure storage 21.

The interface unit 255 provides a function of communication between software and the trusted software. The interface unit 255 enables communication between any software in a normal software area, and the trusted software.

Note that the trusted software execution unit 25 is not limited to the configuration in FIG. 6, and has only to have two features below. A first feature is a feature of being able to verify trusted software operating inside the trusted software execution unit 25, and being able to access the trusted software from a normal software area only through a specific interface. A second feature is a feature of being able to invoke information stored in the secure storage 21 from internal trusted software. As a trusted software execution unit 25 having these features, ARM (registered trademark) TrustZone (registered trademark), Intel (registered trademark) Software Gard eXtensions (Intel SGX), or the like provided an extended function of a processor is conceivable. However, a trusted software execution unit 25 having the above-described features is not limited to the above-described trusted software execution unit.

The above is a description regarding the configuration of the information processing device 20 according to the present example embodiment. Note that the configuration illustrated in each of FIGS. 6 to 8 is one example, and does not limit the configuration of the information processing device 20 to an unchanged form. Additionally, a connection relation among components illustrated in FIG. 6 is one example, and does not limit a connection relation among components.

(Operation)

Figure 9:
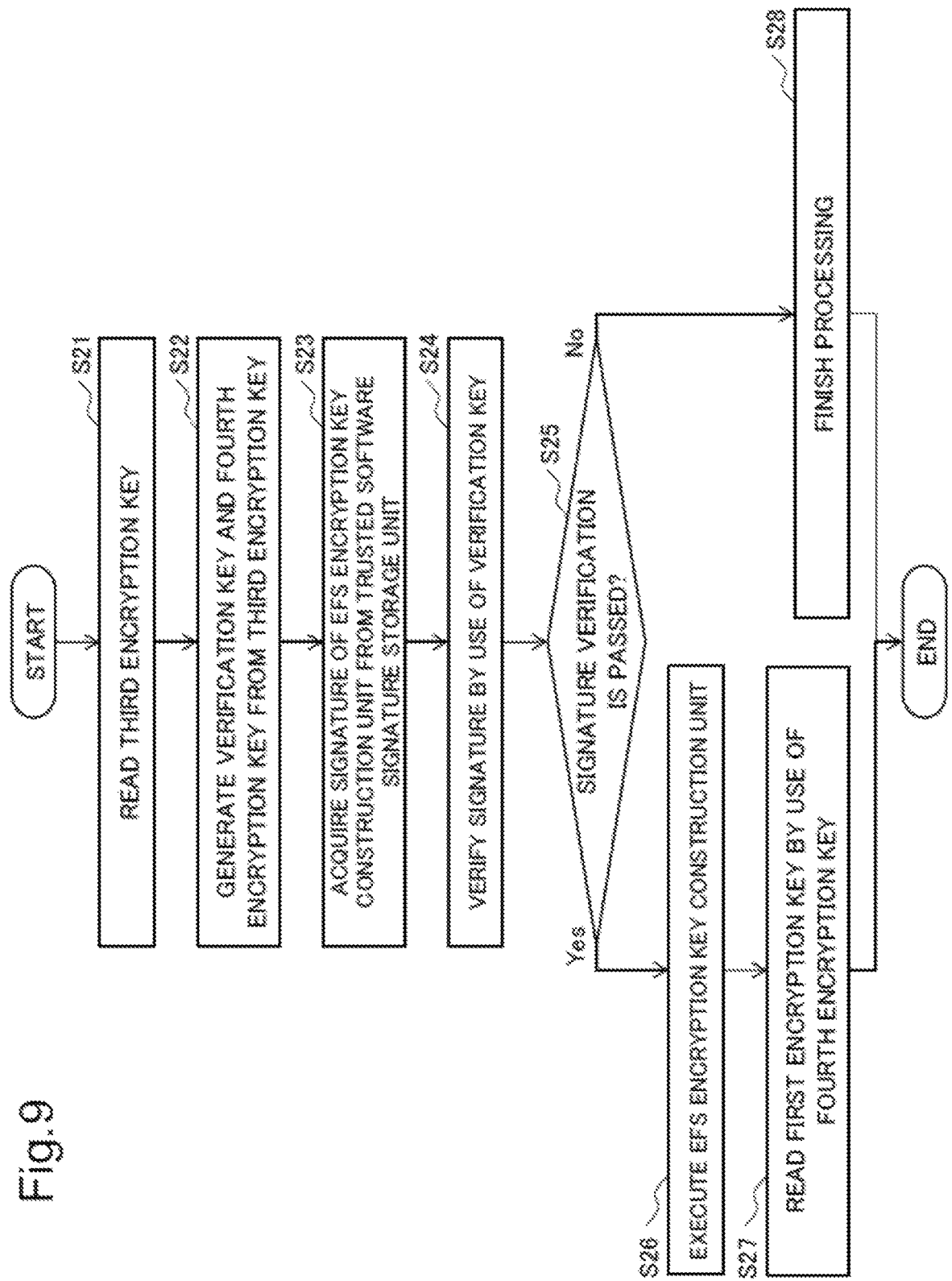
FIG. 9 is a flowchart for describing an operation of the information processing device according to the second example embodiment of the present invention.

Next, an operation of the information processing device according to the present example embodiment is described with reference to the drawing. FIG. 9 is a flowchart for describing an operation of the trusted software execution unit 25 of the information processing device according to the present example embodiment. Processing along the flowchart in FIG. 9 relates to processing in the step S13 of the flowchart in FIG. 5. More specifically, processing along the flowchart in FIG. 9 relates to an operation in which the trusted software execution unit 25 verifies the EFS encryption key construction unit 251 being trusted software, and the EFS encryption key construction unit 251 reads a first encryption key from the first encryption key keeping unit 211.

In FIG. 9, first, the trusted OS 254 reads a third encryption key K3_edgeA from the tamper resistance information storage unit 253 (step S21).

Next, the trusted OS 254 generates a key pair (Pk_sig_edgeA, Pk_var_edgeA) and a fourth encryption key Ck4_edgeA, with the third encryption key K3_edgeA as a seed (step S22).

Next, the trusted OS 254 acquires a signature Sig (Hash (EFS encryption key construction unit), Pk_sig_edgeA) of the EFS encryption key construction unit 251 from the trusted software signature storage unit 212 in the secure storage 21 (step S23).

Next, the trusted OS 254 calculates a hash value Hash (EFS encryption key construction unit) of the EFS encryption key construction unit 151. The trusted OS 254 verifies the acquired signature Sig (Hash (EFS encryption key construction unit), Pk_sig_edgeA) by using the hash value and a verification key Pk_var_edgeA (step S24). In this instance, as long as the EFS encryption key construction unit 151 is not tampered with, signature verification is passed.

Herein, the trusted software execution unit 25 determines whether signature verification is passed (step S25). When signature verification is passed in the step S25 (Yes in step S25), the trusted software execution unit 25 executes processing of the EFS encryption key construction unit 251 (step S26).

Then, the EFS encryption key construction unit 251 decrypts encrypted information Enc (Ck1_edgeA, Ck4_edgeA) stored in the first encryption key keeping unit 211, by using the fourth encryption key Ck4_edgeA generated by the trusted OS 254 (step S27).

On the other hand, when signature verification is not passed in the step S25 (No in step S25), processing is finished (step S28).

The above is a description relating to the operation in which the trusted software execution unit 25 verifies the EFS encryption key construction unit 251 being trusted software, and the EFS encryption key construction unit 251 reads a first encryption key from the first encryption key keeping unit 211. The EFS encryption key construction unit 251 constructs an EFS encryption key by using a first encryption key read by the procedure along the flowchart in FIG. 9, and a second encryption key. This processing is equivalent to processing in the step S14 of the flowchart in FIG. 5. Note that the processing along the flowchart in FIG. 9 is one example, and does not limit the operation of the trusted software execution unit 25 to an unchanged procedure.

As above, a signature information storage unit is included, in addition to a first encryption key keeping unit, inside an access limit area of a secure storage of the information processing device according to the present example embodiment. The signature information storage unit stores signature information for trusted software generated by using a signature key generated under a predetermined rule, based on a third encryption key. The secure storage is encrypted by a fourth encryption key being configured under a predetermined rule by a third encryption key, and serving to encrypt and decrypt data encrypted inside the secure storage. A software execution unit includes a trusted operating system, a tamper resistance information storage unit, and an interface unit. The trusted operating system is able to access the signature information storage unit. The tamper resistance information storage unit is limited in overwriting and reading from outside of the software execution unit, and stores a third encryption key. The interface unit provides a function of communication between trusted software included in the software execution unit and any software.

The software execution unit acquires a second encryption key from a setup processing activation unit, and acquires a third encryption key from the tamper resistance information storage unit in line with acquisition of the second encryption key. The software execution unit decrypts encrypted signature information stored in the signature information storage unit by using the acquired third encryption key. The software execution unit verifies reliability of internal software of the software execution unit by using the decrypted signature information, and operates trusted software, based on a verification result.

In the information processing device according to the present example embodiment, a trusted software execution unit confirms whether an EFS encryption key construction unit being trusted software is tampered with. Then, the trusted software execution unit constructs an EFS encryption key by using a first encryption key and a second encryption key at activation of the device, by an EFS encryption key construction unit being trusted software determined not to be tampered with. In the information processing device according to the present example embodiment, an encrypted file system is set up by using the EFS encryption key. Thus, the information processing device according to the present example embodiment can set up an encrypted file system by the information processing device alone. As a result, in the information processing device according to the present example embodiment, important information is constantly encrypted on a storage area, and software that needs to access information is brought into a state of being able to appropriately access even when the information processing device alone is activated.

In other words, by incorporating the information processing device according to the present example embodiment into an IoT system as an edge, it is possible to achieve an IoT system which protects important information by encryption, and yet continuously runs even when a network is interrupted and a manager is absent.

In an encrypted file system included in the information processing device according to the present example embodiment, an EFS encryption key needs to be held in a volatile storage area or the like inside the system. Basically, a file system is executed in a privileged mode of an operating system. Thus, an EFS encryption key held in the encrypted file system is not accessible from a process generated by a normal user.

Third Example Embodiment

Next, an information processing device according to a third example embodiment of the present invention is described with reference to the drawings. The information processing device according to the present example embodiment is different from the information processing device according to the first example embodiment in verifying whether an encrypted file system is tampered with. Note that a function of the information processing device according to the present example embodiment may be added to the information processing device according to the second example embodiment.

(Configuration)

Figure 10:
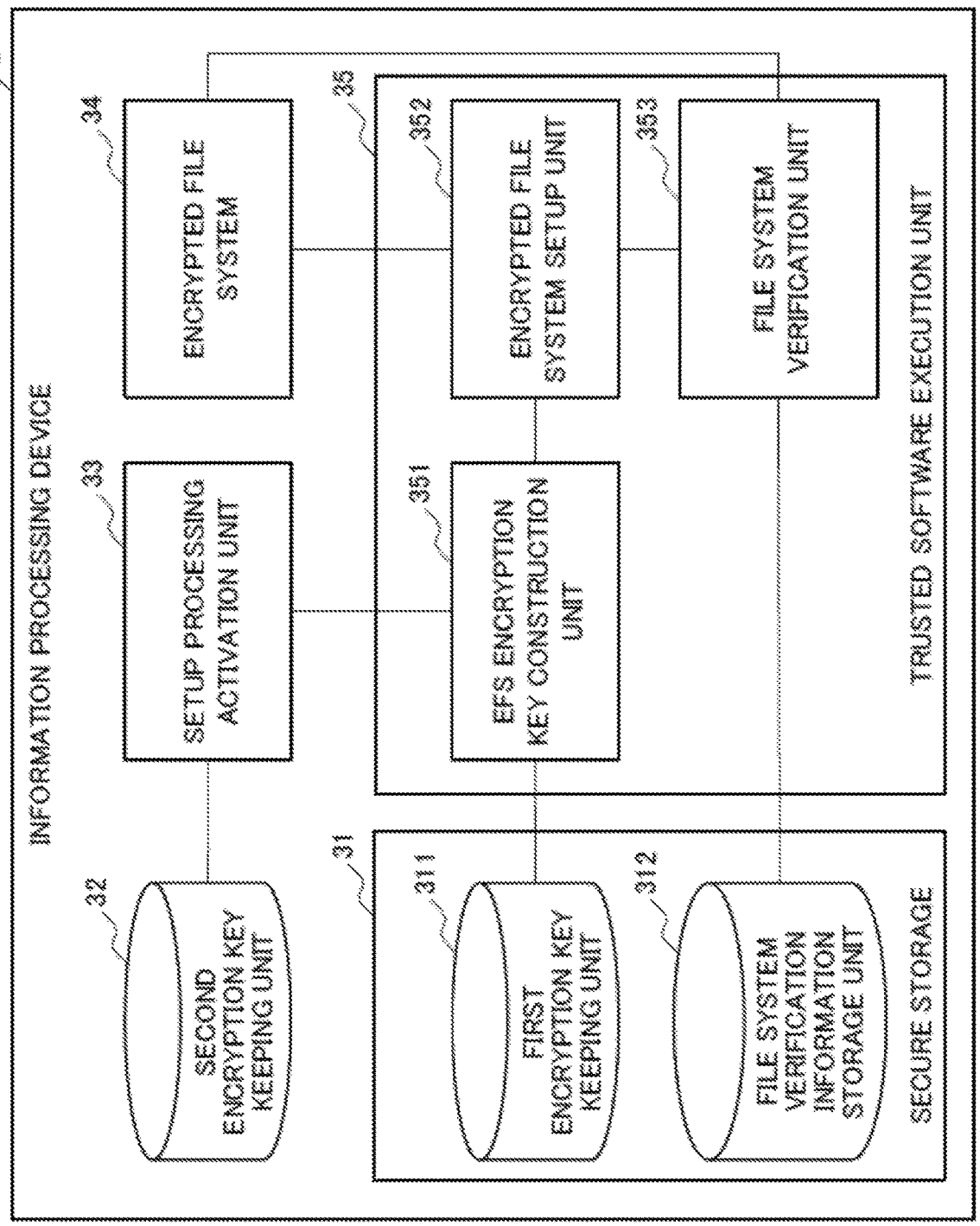
FIG. 10 is a block diagram illustrating one example of a configuration of an information processing device according to a third example embodiment of the present invention.

FIG. 10 is a block diagram illustrating one example of a configuration of an information processing device 30 according to the present example embodiment. As in FIG. 10, the information processing device 30 includes a secure storage 31, a second encryption key keeping unit 32, a setup processing activation unit 33, an encrypted file system 34, and a trusted software execution unit 35. Secure isolated areas are configured inside the secure storage 31 and the trusted software execution unit 35.

The information processing device 30 (FIG. 10) according to the present example embodiment is different from the information processing device 10 (FIG. 1) according to the first example embodiment in configurations of the secure storage 31 and the trusted software execution unit 35. Components other than the secure storage 31 and the trusted software execution unit 35 in the information processing device 30 (FIG. 10) are similar to those in the information processing device 10 (FIG. 1) except for some functions. Thus, a difference from the information processing device 10 (FIG. 1) is described below.

As in FIG. 10, the secure storage 31 includes a file system verification information storage unit 312 in addition to a first encryption key keeping unit 311.

The file system verification information storage unit 312 (also referred to as a verification information storage area) stores file system verification information such as signature information for a program of the encrypted file system 34. FIG. 11 is one example of file system verification information stored in the file system verification information storage unit 312. FIG. 11 illustrates an example in which a signature generated for the encrypted file system 34 is stored as file system verification information by using a signature key Pk_sig_edgeA. Note that the signature key Pk_sig_edgeA in FIG. 11 is one example, and does not limit the file system verification information stored in the file system verification information storage unit 312.

Furthermore, as in FIG. 10, the trusted software execution unit 35 includes a file system verification unit 353, in addition to an EFS encryption key construction unit 351 and an encrypted file system setup unit 352.

The file system verification unit 353 verifies the encrypted file system 34 by using file system verification information stored in the file system verification information storage unit 312.

The above is a description regarding the configuration of the information processing device 30 according to the present example embodiment.

(Operation)

Figure 12:
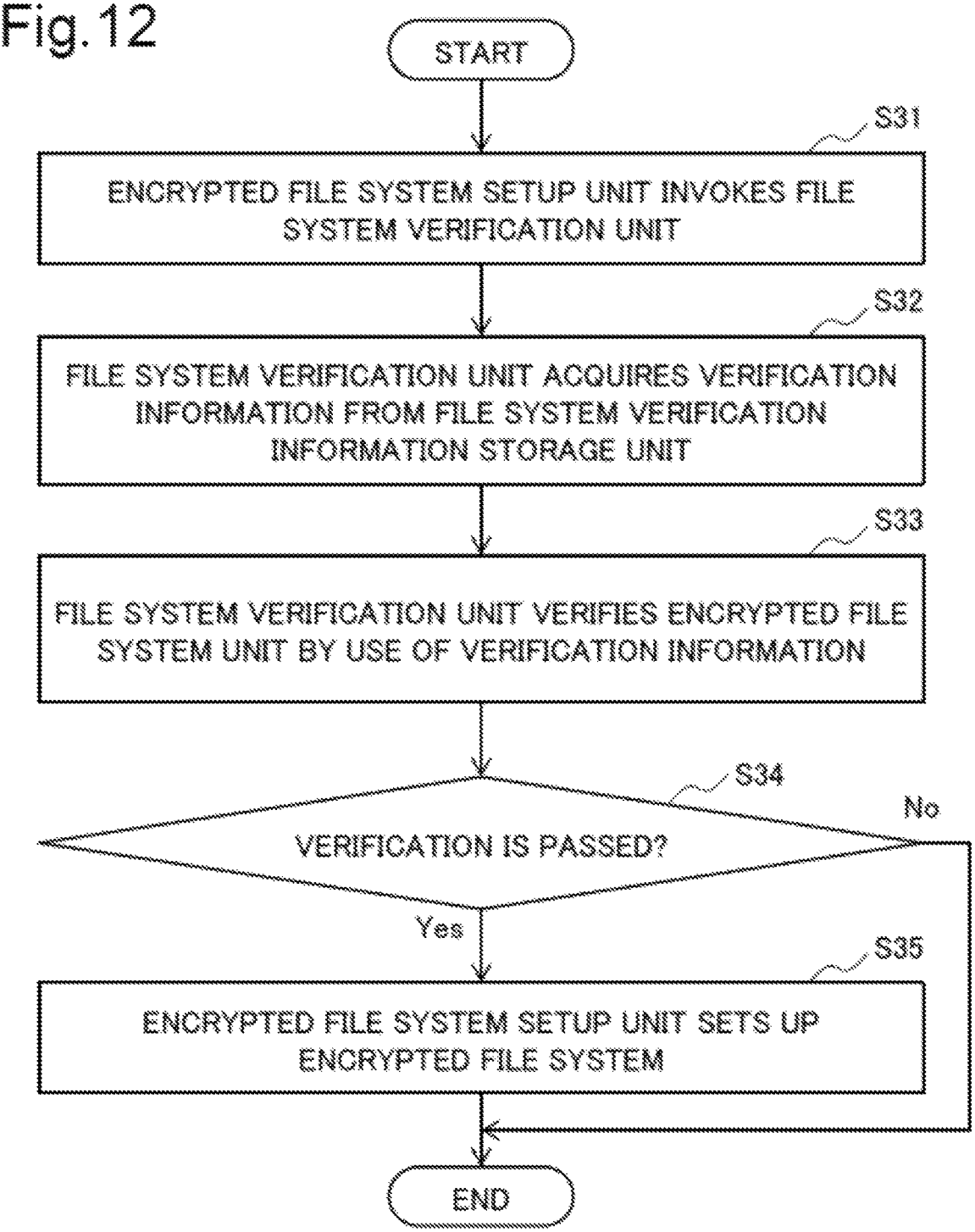
FIG. 12 is a flowchart for describing an operation of the information processing device according to the third example embodiment of the present invention.

Next, an operation of the information processing device according to the present example embodiment is described with reference to the drawing. FIG. 12 is a flowchart for describing an operation of the trusted software execution unit 35 of the information processing device according to the present example embodiment. Processing along the flowchart in FIG. 12 relates to processing in the step S15 of the flowchart in FIG. 5.

In FIG. 12, first, the encrypted file system setup unit 352 invokes the file system verification unit 353 (step S31).

Next, the file system verification unit 353 acquires file system verification information from the file system verification information storage unit 312 (step S32).

Next, the file system verification unit 353 verifies by using the file system verification information whether the encrypted file system 34 is tampered with (step S33). Herein, the file system verification unit 353 verifies whether the encrypted file system 34 is tampered with by performing signature verification for a hash value of a program of the encrypted file system 34.

When verification is passed (Yes in step S34), the file system verification unit 353 sets up the encrypted file system 34 (step S35). On the other hand, when verification is not passed (No in step S34), the file system verification unit 353 does not set up the encrypted file system 34.

The above is a description regarding to the operation of the trusted software execution unit 35 in the information processing device according to the present example embodiment. Note that the processing along the flowchart in FIG. 12 is one example, and does not limit the operation of the trusted software execution unit 35 to an unchanged procedure.

As above, a secure storage of the information processing device according to the present example embodiment includes, inside an access limit area, a verification information storage unit which stores file system verification information for verifying whether an encrypted file system is tampered with. A software execution unit includes a file system verification unit which is connected to the verification information storage unit, and verifies by using file system verification information stored in the verification information storage unit whether an encrypted file system is tampered with.

The information processing device according to the present example embodiment verifies whether an encrypted file system is tampered with, and executes setup of the encrypted file system after confirming that the encrypted file system is not tampered with. Thus, the information processing device according to the present example embodiment is able to prevent leakage of an EFS encryption key at setup of an encrypted file system even when the encrypted file system is tampered with.

Fourth Example Embodiment

Next, an information processing device according to a fourth example embodiment of the present invention is described with reference to the drawings. The information processing device according to the present example embodiment is different from the information processing device according to the first example embodiment in that an encrypted file system includes a plurality of encrypted areas.

Figure 13:
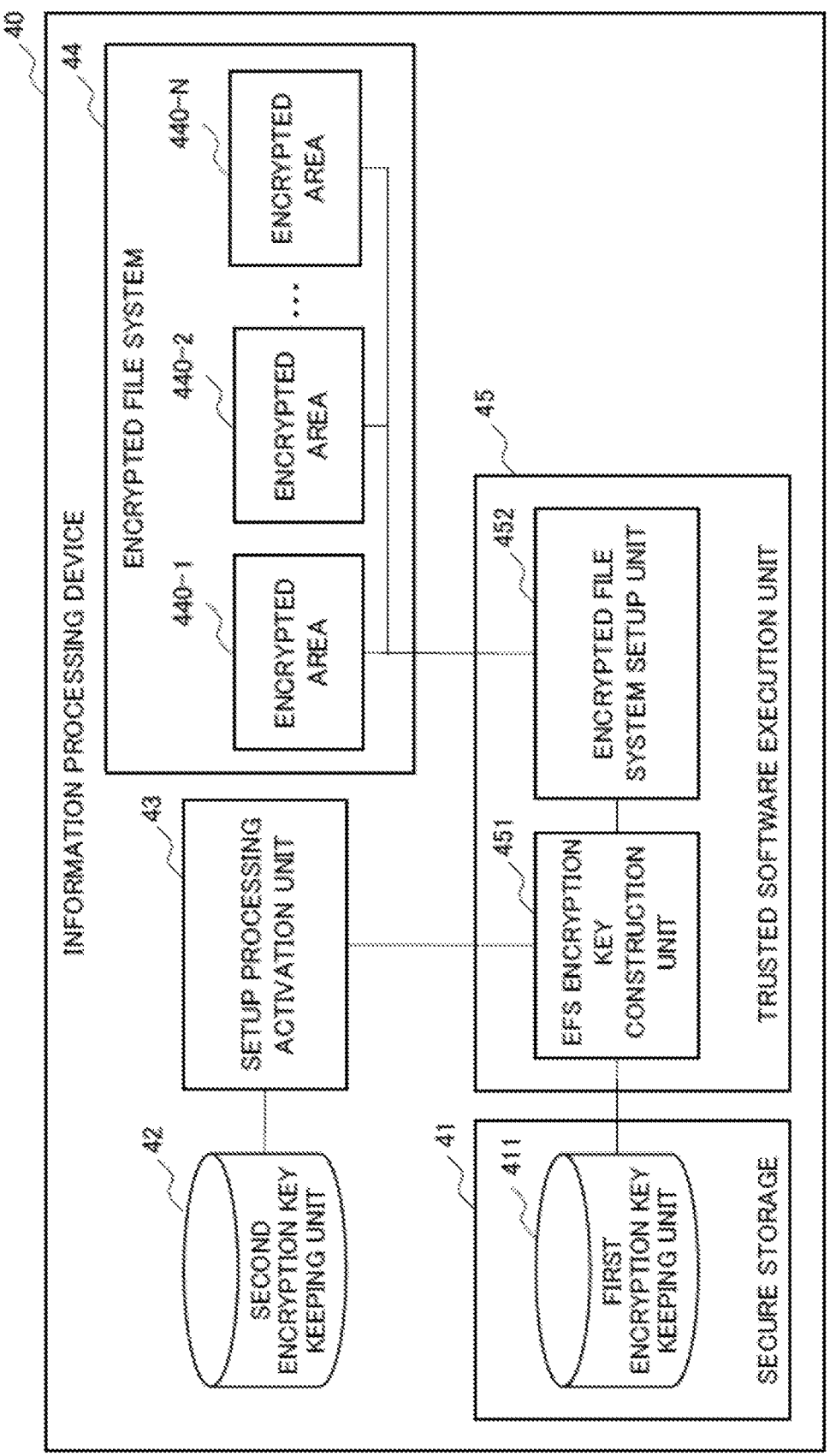
FIG. 13 is a block diagram illustrating one example of a configuration of an information processing device according to a fourth example embodiment of the present invention.

FIG. 13 is a block diagram illustrating one example of a configuration of an information processing device 40 according to the present example embodiment. As in FIG. 13, the information processing device 40 includes a secure storage 41, a second encryption key keeping unit 42, a setup processing activation unit 43, an encrypted file system 44, and a trusted software execution unit 45. Secure isolated areas are configured inside the secure storage 41 and the trusted software execution unit 45.

The information processing device 40 (FIG. 13) according to the present example embodiment is different from the information processing device 10 (FIG. 1) according to the first example embodiment in a configuration of the encrypted file system 44. Components other than the encrypted file system 44 in the information processing device 40 (FIG. 13) are similar to those in the information processing device 10 (FIG. 1) except for some functions. Thus, a difference from the information processing device 10 (FIG. 1) is described below.

As in FIG. 13, the encrypted file system 44 includes a plurality of encrypted areas 440-1 to N (N is an integer of 2 or more). The plurality of encrypted areas 440-1 to N each are encrypted by different EFS encryption keys. FIG. 14 is one example of storage information stored in the encrypted area 410-1. For example, storage information associated with at least each one of files is stored in the encrypted area 440-1. In FIG. 14, Enc (A, B) represents encrypted information of a source file A encrypted by using a common encryption key (EFS encryption key) called B. Hereinafter, unless distinguished from one another, the plurality of encrypted areas 440-1 to N are described as an encrypted area 440 by removing a hyphen and a number at an end.

The second encryption key keeping unit 42 keeps a plurality of second encryption keys associated with the plurality of encrypted areas 440-1 to N, respectively. As in FIG. 15, a plurality of second encryption keys associated with the plurality of respective encrypted areas 440-1 to N are kept in the second encryption key keeping unit 42. In FIG. 15, Enc (A, B) indicates encrypted information relating to an EFS encryption key A encrypted by using a first encryption key B. Note that the plurality of second encryption keys in FIG. 15 are one example, and do not limit a second encryption key kept by a second encryption key keeping unit 12.

The setup processing activation unit 43 acquires a second encryption key associated with a specified encrypted area 440 from the second encryption key keeping unit 42. The setup processing activation unit 43 outputs the acquired second encryption key to an EFS encryption key construction unit 451.

The EFS encryption key construction unit 451 acquires the second encryption key from the setup processing activation unit 43. The EFS encryption key construction unit 451 acquires a first encryption key kept in a first encryption key keeping unit 411 of the secure storage 41, and constructs an EFS encryption key by using the first encryption key and the second encryption key. The EFS encryption key construction unit 451 outputs the constructed EFS encryption key to an encrypted file system setup unit 452.

By using the EFS encryption key constructed by the EFS encryption key construction unit 451, the encrypted file system setup unit 452 sets up the encrypted file system 44 in such a way that the specified encrypted area 440 is accessible.

The above is a description regarding one example of the configuration of the information processing device 40 according to the present example embodiment. Note that the configuration illustrated in FIG. 13 is one example, and does not limit the configuration of the information processing device 40 to an unchanged form.

As above, an encrypted file system of the information processing device according to the first example embodiment includes a plurality of encrypted areas encrypted by different common encryption keys. A second encryption key keeping unit keeps a plurality of second encryption keys associated with a plurality of respective encrypted areas. A common encryption key construction unit constructs a common encryption key associated with an encrypted area, by using a second encryption key associated with a specified encrypted area, and a first encryption key. The common encryption key construction unit sets up an encrypted file system by using the constructed common encryption key in such a way as to be accessible from software to a specified encrypted area.

The information processing device according to the present example embodiment configures an encrypted area encrypted by a plurality of EFS encryption keys in an encrypted file system, and keeps a plurality of second encryption keys associated with the encrypted areas in the second encryption key keeping unit. The information processing device according to the present example embodiment keeps a plurality of second encryption keys associated with a plurality of encrypted areas, and therefore enables a plurality of encrypted file systems to be utilized, without changing a trusted software execution unit and a content in a secure storage.

Fifth Example Embodiment

Next, an information processing system according to a fifth example embodiment of the present invention is described with reference to the drawings. The information processing system according to the present example embodiment is an IoT system including at least one of the information processing devices according to the first to fourth example embodiments as an edge. The information processing device in the information processing system according to the present example embodiment may be configured by any one kind of the information processing devices according to the first to fourth example embodiments, or may be configured by combining some kinds of information processing devices according to the first to fourth example embodiments in any way.

Figure 16:
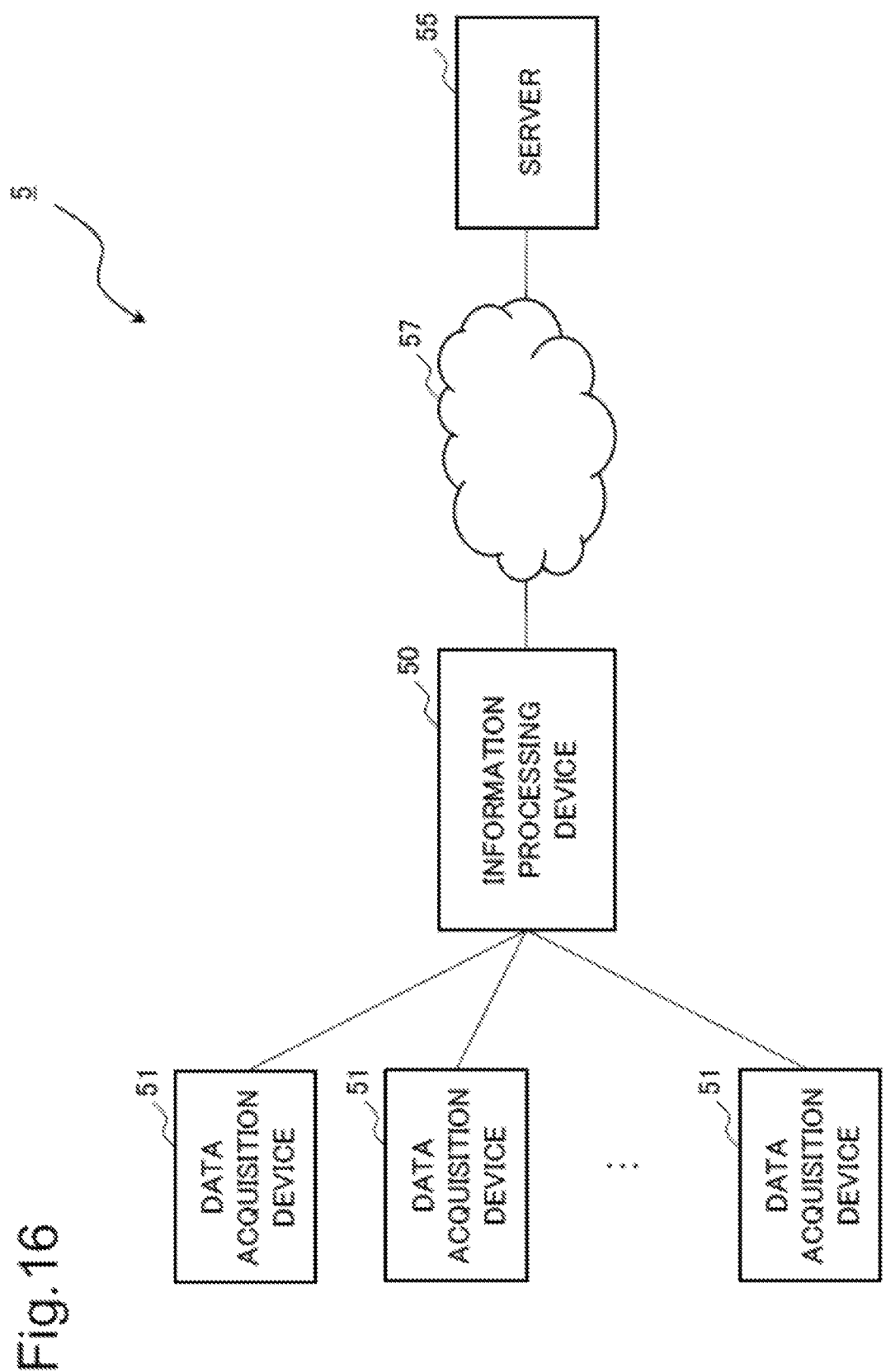
FIG. 16 is a conceptual diagram illustrating one example of a configuration of an information processing system according to a fifth example embodiment of the present invention.

FIG. 16 is a conceptual diagram for describing a configuration of an information processing system 5 according to the present example embodiment. The information processing system 5 includes an information processing device 50, at least one data acquisition device 51, and a server 55. The information processing device 50 and the server 55 are connected to each other via a network 57 such as the Internet or an intranet. Note that, when the network 57 is configured as a local network, the network 57 may be added to the information processing system 5.

The information processing device 50 is connected to a plurality of data acquisition devices 51 being capable of data communication by wireless communication or wired communication. Moreover, the information processing device 50 is connected to the server 55 via the network 57. The information processing device 50 is at least one of the information processing devices according to the first to fourth example embodiments. The information processing device 50 receives data acquired by a plurality of data acquisition devices 51. The information processing device 50 applies processing to the data from the plurality of data acquisition devices 51, and transmits the processed data to the server 55 via the network 57. It is preferable that the information processing device 50 transmits, to the server 55, data from the plurality of data acquisition devices 51 after bundling the data.

The information processing system 5 may be configured by a single information processing device 50 or may be configured by a plurality of information processing devices 50. When there are a plurality of information processing devices 50 that configure the information processing system 5, the information processing devices 50 may be data-communicably connected to one another.

The data acquisition device 51 is connected to the information processing device 50 being capable of data communication by wireless communication or wired communication. The data acquisition device 51 is a device which acquires various kinds of information measured in an installed environment. The data acquisition device 51 converts acquired information into an electric signal (data) and then transmits the electric signal (data) to the information processing device 50. For example, the data acquisition device 51 is implemented by a sensor such as a temperature sensor, a humidity sensor, a pressure sensor, a light sensor, a geomagnetic sensor, a global positioning system (GPS), an acceleration sensor, a gyro sensor, an image sensor, a sound sensor, or a distance sensor. Note that, regardless of these sensors, the data acquisition device 51 has only to be a device which acquires some information, converts the information into an electric signal (data), and then transmits the electric signal (data) to the information processing device 50.

The server 55 is connected to the information processing device 50 via the network 57. The server 55 receives data transmitted from the information processing device 50, and stores and processes the received data. The server 55 is a computer placed in a data center, a server room, or the like, or an application.

The above is a description regarding the configuration of the information processing system 5 according to the present example embodiment. Note that the information processing system 5 is not limited to the configuration illustrated in FIG. 16 as long as the information processing system 5 achieves an IoT system. In particular, it is preferable that the information processing system 5 is configured in such a way as to achieve an IoT system which enables edge computing.

As above, the information processing system according to the present example embodiment includes one of the information processing devices according to the first to fourth example embodiments, at least one data acquisition device data-communicably connected to the information processing device, and a server connected to the information processing device via a network. The data acquisition device transmits data measured in an installed environment to the information processing device. The server receives data transmitted from the information processing device, and executes processing using the received data.

By applying the information processing system according to the present example embodiment to an IoT system, both autonomous reactivation of an edge and encryption of information are accomplished even when an information processing device (also referred to as an edge) is not stably connected to a network. Thus, the present example embodiment enables to provide secure and continuous running of an IoT system.

(Hardware)

Figure 17:
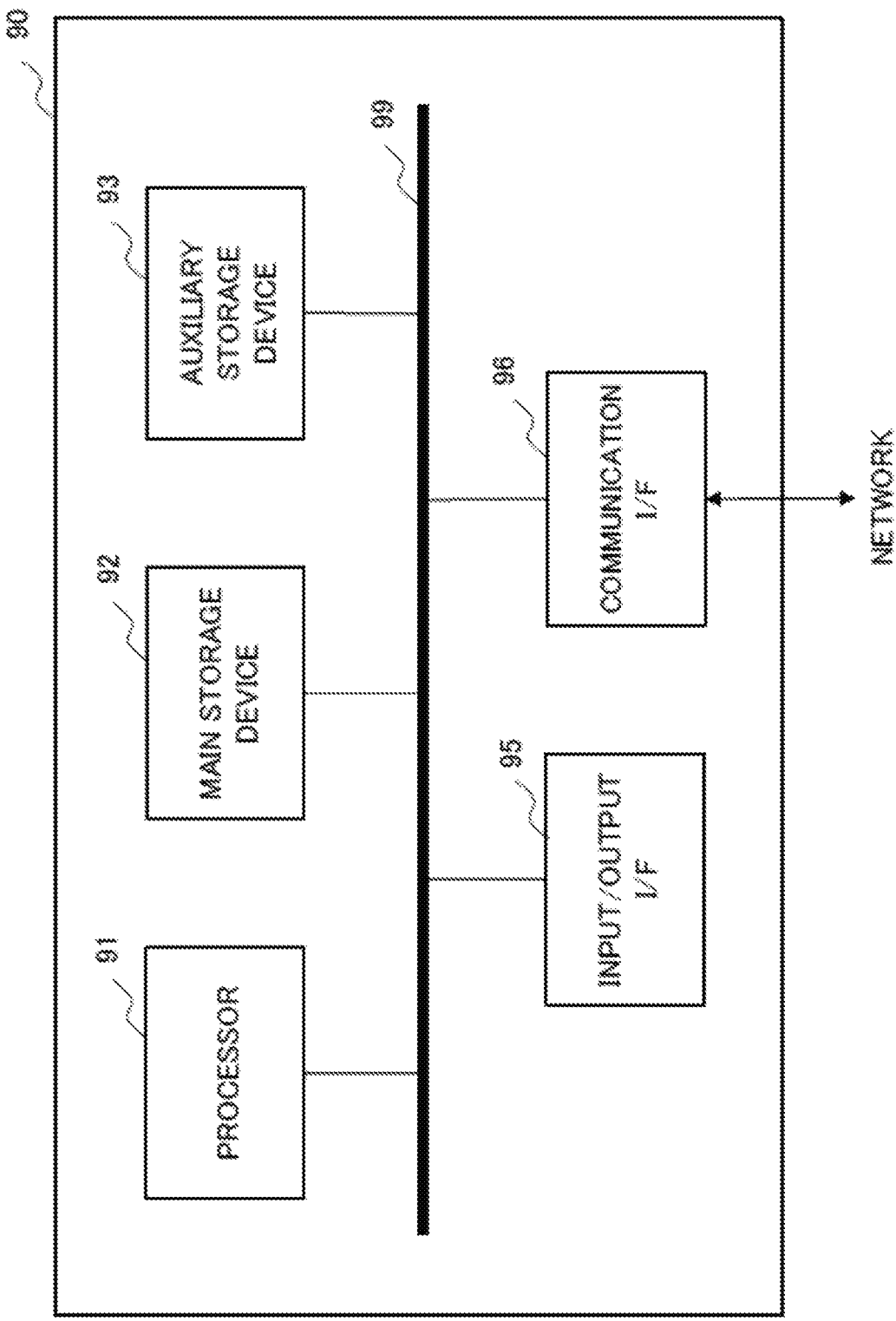
FIG. 17 is a block diagram illustrating one example of a hardware configuration which implements the information processing device according to each of the first to fourth example embodiments of the present invention.

Herein, a hardware configuration which executes processing of the information processing device according to each of the example embodiments of the present invention is described by citing an information processing device 90 in FIG. 17 as one example. Note that the information processing device 90 in FIG. 17 is a configuration example for executing processing of the information processing device according to each of the example embodiments, and does not limit the scope of the present invention.

As in FIG. 17, the information processing device 90 includes a processor 91, a main storage device 92, an auxiliary storage device 93, an input/output interface 95, and a communication interface 96. In FIG. 17, an interface is expressed as "I/F" for brevity. The processor 91, the main storage device 92, the auxiliary storage device 93, the input/output interface 95, and the communication interface 96 are data-communicably connected to one another via a bus 99. Further, the processor 91, the main storage device 92, the auxiliary storage device 93, and the input/output interface 95 are connected to a network such as the Internet or an intranet via the communication interface 96.

The processor 91 expands a program stored in the auxiliary storage device 93 or the like in the main storage device 92, and executes the expanded program. In the present example embodiment, a configuration using a software program installed in the information processing device 90 has only to be provided. The processor 91 executes processing by the information processing device according to the present example embodiment.

The main storage device 92 has an area where a program is expanded. The main storage device 92 has only to be a volatile memory such as a dynamic random access memory (DRAM), for example. Moreover, a non-volatile memory such as a magnetoresistive random access memory (MRAM) may be configured and added as the main storage device 92. For example, second encryption units 12, 22, 32, and 42 included in each of information processing devices 10, 20, 30, and 40 according to each of first to fourth example embodiments are constructed in the main storage device 92.

The auxiliary storage device 93 stores various data. The auxiliary storage device 93 is configured by a local disc such as a hard disc or a flash memory. Note that it is also possible to provide a configuration which stores various data in the main storage device 92, and omit the auxiliary storage device 93. For example, secure storages 11, 21, 31, and 41 included in each of information processing devices 10, 20, 30, and 40 according to each of first to fourth example embodiments are constructed in the auxiliary storage device 93. For example, secure storages 11, 21, 31, and 41 included in each of information processing devices 10, 20, 30, and 40 according to each of first to fourth example embodiments are constructed in the auxiliary storage device 93. For example, each of encrypted file system 14 24, 34, and 44 included in each of information processing devices 10, 20, 30, and 40 according to first to fourth example embodiments are constructed in the auxiliary storage device 93.

The input/output interface 95 is an interface for connecting the information processing device 90 to peripheral equipment. The communication interface 96 is an interface for connecting to an external system or device through a network such as the Internet or an intranet, based on a standard or a specification. The input/output interface 95 and the communication interface 96 may be formed as a common interface for connecting to external equipment.

Furthermore, the information processing device 90 may be equipped with display equipment for displaying information. When equipped with display equipment, the information processing device 90 is preferably provided with a display control device (not illustrated) for controlling display of the display equipment. Display equipment has only to be connected to the information processing device 90 via the input/output interface 95.

Still further, the information processing device 90 may be equipped with a disc drive according to need. The disc drive is connected to the bus 99. Between the processor 91 and an unillustrated recording medium (program recording medium), the disc drive mediates reading of a data program from a recording medium, writing of a processing result of the information processing device 90 into the recording medium, and the like. A recording medium can be implemented by an optical recording medium such as a compact disc (CD) or a digital versatile disc (DVD). Moreover, a recording medium may be implemented by a semiconductor recording medium such as a universal serial bus (USB) memory or a secure digital (SD) card, a magnetic recording medium such as a flexible disc, or another recording medium.

The above is one example of a hardware configuration for enabling the information processing device according to each of the example embodiments of the present invention. Note that the hardware configuration in FIG. 17 is one example of a hardware configuration for executing calculation processing of the information processing device according to each of the example embodiments, and does not limit the scope of the present invention. Additionally, a program which causes a computer to execute processing relating to the information processing device according to each of the example embodiments also falls within the scope of the present invention. Further, a program recording medium recording a program according to each of the example embodiments also falls within the scope of the present invention.

Components of the information processing device according to each of the example embodiments can be combined in any way. Moreover, a component of the information processing device according to each of the example embodiments may be implemented by software, or may be implemented by a circuit.

An example advantage according to the invention is to provide an information processing device which accomplishes both autonomous reactivation of an edge and encryption of information and enables secure and continuous running of an IoT system, without being stably connected to a network.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

The invention claimed is:

1. An information processing device comprising:
a secure storage which includes an access limit area accessible by only trusted software executed in the information processing device, and in which a first encryption key keeping area keeping a first encryption key is configured inside the access limit area;
a second encryption key keeping area configured to keep a second encryption key, the second encryption key is configured to be a common encryption key encrypted by the first encryption key;
an encrypted file system including an encrypted area recording processing target data encrypted by the common encryption key;
at least one memory storing instructions; and
at least one processor connected to the at least one memory and configured to execute the instructions to:
acquire the second encryption key from the second encryption key keeping area in response to activation of the information processing device;
output the acquired second encryption key to the trusted software;
cause the trusted software to acquire the first encryption key from the first encryption key keeping area in line with acquisition of the second encryption key;
cause the trusted software to construct the common encryption key by using the first encryption key and the second encryption key being acquired; and
cause the trusted software to set up, by using the common encryption key, the encrypted file system in such a way as to be accessible from any software.

2. The information processing device according to claim 1, wherein the at least one processor is configured to execute the instructions to:
acquire the second encryption key;
verify whether a transmission source of the acquired second encryption key is a valid process,
acquire the first encryption key from the first encryption key keeping area when the transmission source of the acquired second encryption key is a valid process;
construct the common encryption key by using the first encryption key and the second encryption key being acquired; and
set up the encrypted file system in such a way as to be accessible from any software by using the constructed common encryption key.

3. The information processing device according to claim 2, wherein the at least one processor is configured to execute the instruction to record the processing target data encrypted for each file by the common encryption key.

4. The information processing device according to claim 2, wherein
the secure storage includes, inside the access limit area, a signature information storage area which is configured to store signature information for the trusted software being generated by using a signature key generated under a predetermined rule, based on a third encryption key, and the secure storage is encrypted by a fourth encryption key being configured under the predetermined rule by the third encryption key, and serving to encrypt and decrypt data encrypted inside the secure storage, and
the at least one processor is configured to execute the instructions to:
store the third encryption key in a tamper resistance information storage area which is limited in overwriting and reading from outside;

operate a trusted operating system which verifies trusted software by using the trusted software signature and the third encryption key, operates only the trusted software determined to be valid, and enables reading and writing of the trusted software and the access limit area; and provide a function of communication between the trusted software included in the access limit area and any software through an interface.

5. The information processing device according to claim 4, wherein the at least one processor is configured to execute the instructions to:

acquire the second encryption key;

acquire the third encryption key from the tamper resistance information storage area in line with acquisition of the second encryption key;

decrypt the encrypted signature information stored in the signature information storage area by using the acquired third encryption key;

verify reliability of software inside by using the decrypted signature information; and operate the trusted software based on the verified result.

6. The information processing device according to claim 2, wherein the secure storage includes, inside the access limit area, a verification information storage area which stores file system verification information for verifying whether the encrypted file system is tampered with, and the at least one processor is configured to execute the instruction to verify, by using the file system verification information stored in the verification information storage area, whether the encrypted file system is tampered with.

7. The information processing device according to claim 2, wherein the encrypted file system includes a plurality of the encrypted areas encrypted by the different common encryption keys, and the at least one processor is configured to execute the instructions to:

keep a plurality of the second encryption keys associated with a plurality of the respective encrypted areas;

construct the common encryption key associated with the encrypted area, by using the second encryption key associated with the specified encrypted area, and the first encryption key; and set up the encrypted file system in such a way as to be accessible from any software to the specified encrypted area by using the constructed common encryption key.

8. An information processing system comprising:

the information processing device according to claim 1;

at least one data acquisition device configured to be data-communicably connected to the information processing device, and transmit data measured in an installed environment to the information processing device; and a server configured to be connected to the information processing device via a network, receive data transmitted from the information processing device, and execute processing using the received data.

9. An information processing method by an information processing device including a secure storage which includes an access limit area accessible by only trusted software executed in the information processing device, and in which a first encryption key keeping area keeping a first encryption key is configured inside the access limit area a second encryption key keeping area configured to keep a second encryption key, the second encryption key is configured to be a common encryption key encrypted by the first encryption key, and an encrypted file system which includes an encrypted area recording processing target data encrypted by the common encryption key, the method comprising:

keeping a first encryption key in a first encryption key keeping area inside an access limit area accessible by only trusted software executed by a local device;

keeping a common encryption key encrypted by using the first encryption key in a second encryption key keeping area, as a second encryption key;

acquiring the second encryption key from the second encryption key keeping area in response to activation of the information processing device;

outputting the acquired second encryption key to the trusted software;

causing the trusted software to acquire the first encryption key from the first encryption key keeping area in line with acquisition of the second encryption key;

causing the trusted software to construct the common encryption key by using the first encryption key and the second encryption key being acquired; and causing the trusted software to set up, by using the common encryption key, an encrypted file system including an encrypted area recording processing target data encrypted by the common encryption key, in such a way as to be accessible from any software.

10. A non-transitory recording medium recording a program for controlling an information processing device including a secure storage which includes an access limit area accessible by only trusted software executed in the information processing device, and in which a first encryption key keeping area keeping a first encryption key is configured inside the access limit area a second encryption key keeping area configured to keep a second encryption key, the second encryption key is configured to be a common encryption key encrypted by the first encryption key, and an encrypted file system which includes an encrypted area recording processing target data encrypted by the common encryption key, the program causes the information processing device to execute:

processing of keeping a first encryption key in a first encryption key keeping area inside an access limit area accessible by only trusted software trusted executed by a local device;

processing of keeping a common encryption key encrypted by using the first encryption key in a second encryption key keeping area, as a second encryption key;

processing of acquiring the second encryption key from the second encryption key keeping area in response to activation of the information processing device;

processing of outputting the acquired second encryption key to the trusted software;

processing of causing the trusted software to acquire the first encryption key from the first encryption key keeping area in line with acquisition of the second encryption key;

processing of causing the trusted software to construct the common encryption key by using the first encryption key and the second encryption key being acquired; and processing of causing the trusted software to set up, by using the common encryption key, an encrypted file system including an encrypted area recording processing target data encrypted by the common encryption key, in such a way as to be accessible from any software.

\* \* \* \* \*